United States Patent
Råbe

[19]

[11] Patent Number: 5,865,946
[45] Date of Patent: Feb. 2, 1999

[54] ARRANGEMENT IN A DRIVE UNIT FOR AN ULTRASOUND SEALING UNIT

[75] Inventor: Magnus Råbe, Lund, Sweden

[73] Assignee: Tetra Laval Holdings & Finance SA, Pully, Switzerland

[21] Appl. No.: 665,816

[22] Filed: Jun. 19, 1996

[30] Foreign Application Priority Data

Jun. 19, 1996 [SE] Sweden .................................. 9502226

[51] Int. Cl.⁶ ......................... B29C 65/08; H01L 41/083
[52] U.S. Cl. ....................... 156/580.1; 310/323; 310/354
[58] Field of Search .................. 156/73.1, 73.4, 156/580.1, 580.2; 310/331, 323, 328, 358, 368, 369, 345, 354; 53/DIG. 2

[56] References Cited

U.S. PATENT DOCUMENTS

| | | |
|---|---|---|
| 3,175,406 | 3/1965 | Eisner . |
| 3,184,842 | 5/1965 | Maropis . |
| 3,368,085 | 2/1968 | McMaster et al. . |
| 3,524,085 | 8/1970 | Shoh . |
| 3,671,366 | 6/1972 | Miller . |
| 3,772,538 | 11/1973 | Supitilov . |
| 4,074,152 | 2/1978 | Asai et al. . |
| 4,363,992 | 12/1982 | Holze, Jr. . |
| 4,483,571 | 11/1984 | Mishiro . |
| 4,607,185 | 8/1986 | Elbert et al. . |
| 4,651,043 | 3/1987 | Harris et al. . |
| 4,737,939 | 4/1988 | Ricketts . |
| 4,995,938 | 2/1991 | Tsutsumi . |
| 5,057,182 | 10/1991 | Wuchinich . |
| 5,231,325 | 7/1993 | Tamai et al. ............................. 310/354 |
| 5,443,240 | 8/1995 | Cunningham ............................ 310/345 |
| 5,590,866 | 1/1997 | Cunningham ............................ 310/345 |

FOREIGN PATENT DOCUMENTS

| | | |
|---|---|---|
| 0 496 694 | 7/1992 | European Pat. Off. . |
| 0 615 907 | 9/1994 | European Pat. Off. . |
| 40 14 846 | 11/1991 | Germany . |
| 45-12819 | 5/1970 | Japan . |
| 1 168 430 | 6/1983 | Russian Federation . |
| 1 071 616 | 6/1967 | United Kingdom . |
| 1 331 100 | 9/1973 | United Kingdom . |

*Primary Examiner*—Richard Crispino
*Attorney, Agent, or Firm*—Burns, Doane, Swecker & Mathis, L.L.P

[57] ABSTRACT

An ultrasound sealing unit includes a drive unit and a body. The drive unit consists of a number of piezoelectric ceramic plates with interjacent, conductive metal sheets connected to an a.c. source. The drive unit further consists of a counterweight and a clamping screw. The clamping screw holds together under a certain pretensioning the ceramic plates, the metal sheets and the counterweight. Moreover, the clamping screw fixedly secures the drive unit to the body. The body is a homogeneous body consisting of reaction bodies which surround the drive unit, a nodal plane with an anchorage edge and a horn with an elongate, narrow sealing surface. A gasket is disposed so that it constitutes a spacer between the body of the sealing unit and the ceramic plates. The gasket permits the oscillation of the ultrasound sealing unit, but prevents residual flexural stresses from reaching the drive unit. The spacing dimension of the gasket may be selected so as to govern the amplitude of the sealing unit to a predetermined, preselected amplitude.

14 Claims, 1 Drawing Sheet

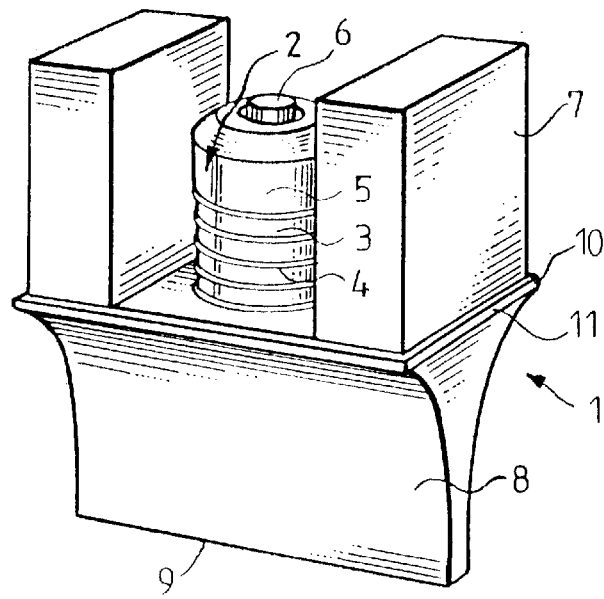
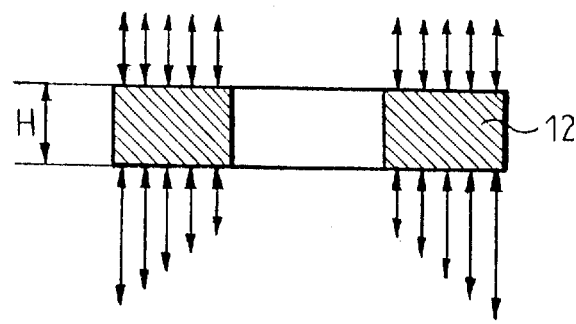
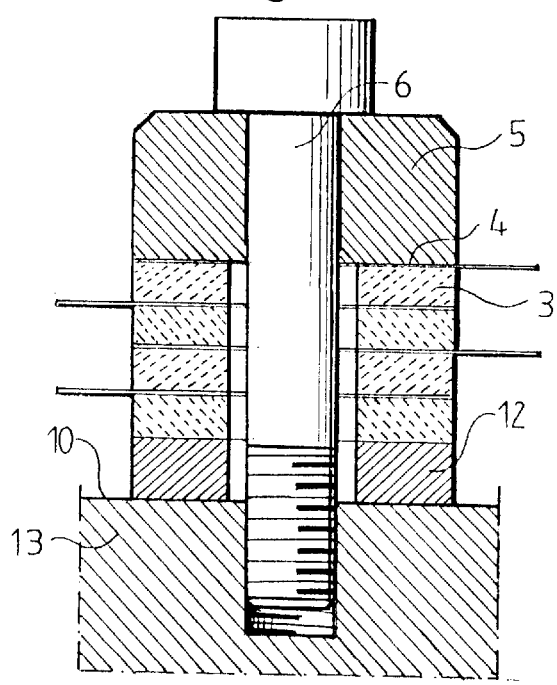

5,865,946

ARRANGEMENT IN A DRIVE UNIT FOR AN ULTRASOUND SEALING UNIT

TECHNICAL FIELD

The present invention relates to an arrangement in a drive unit for an ultrasound sealing unit, the drive unit consisting of a number of piezoelectric ceramic plates which are disposed with interjacent, conductive metal sheets, electrically coupled to an a.c. source, a counterweight and clamping screw, the ultrasound sealing unit comprising a homogenous body on which the drive unit is fixedly mounted.

BACKGROUND ART

Different types of units for sealing by ultrasound are in industrial use today. Swedish Patent Application No. SE 9300918-1 discloses an ultrasound sealing unit which has been particularly developed for use in filling machines of the type which fills liquid foods into packages of the single use disposable type. There is but limited space available in these filling machines for an ultrasound sealing unit, and so the described unit is of a type which has a total length of one half of a wave length. In the filling machine, a material web of a laminate packaging material is formed into a tube which is sealed by a longitudinal joint or seam seal and is filled with the intended contents. The filled material tube is transversely sealed and, in these transverse seals, the material tube is severed to form individual packaging containers. The described sealing unit is intended for the transverse joint seals, for which reason the sealing unit displays an elongate, narrow sealing surface whose width corresponds to the width of the transverse joint seal. In order to achieve the requisite length of the transverse seal, a number of the above described sealing units must be built together to form a composite ultrasound sealing equipment unit. The sealing unit displays reaction bodies surrounding the drive unit, a horn which carries the elongate, narrow sealing surface, and a centrally located nodal plane where the amplitude of the unit is zero and where the unit may be secured in the filling machine.

A sealing unit of the above-outlined type will have an extremely complex geometry. Although, in the centrally located nodal plane, there is an amplitude which is zero, and although this nodal plane is employed for securing the unit, there is a slight residual motion in this plane because of the oscillation of the unit. This motion may be described as an undulation in one plane. The ceramic plates in the drive unit withstand considerable compression loading, but are brittle and highly sensitive to any type of flexural and tensile loading, for which reason the residual motion in the nodal plane may cause the ceramic plates to crack.

When a number of the above-described units are combined together to form an ultrasound sealing equipment unit in a filling machine, and when several filling machines may be employed in the same premises, it is vitally important that the different sealing units operate at the same amplitude in order to ensure complete exchangeability of parts. The piezoelectric ceramic plates are difficult to obtain with uniform characteristics, for which reason different drive units may have minor variations in the amplitude generated.

SUMMARY OF THE INVENTION

One object of the present invention is to be able to manufacture a drive unit in which the minor residual flexural stresses in the nodal plane are reduced to such a low level that they do not constitute a harmful movement for the sensitive ceramic plates.

A further object of the present invention is to be able to manufacture drive units which can operate at a predetermined and preselected amplitude without the quality of the piezoelectric ceramic plates governing the amplitude.

These and other objects have been attained according to the present invention in that an arrangement of the type described by way of introduction has been given the characterizing feature that there is disposed, between the ceramic plates and body of the ultrasound unit, a gasket which constitutes a spacer between the body and the ceramic plates, the gasket permitting oscillation of the ultrasound sealing unit but preventing residual flexural stresses from reaching the drive unit.

Preferred embodiments of the present invention have further been given the characterizing features as set forth in the appended subclaims.

BRIEF DESCRIPTION OF THE ACCOMPANYING DRAWINGS

One preferred embodiment of the present invention will now be described in greater detail hereinbelow, with particular reference to the accompanying Drawings, in which:

FIG. 1 is a perspective view of an ultrasound sealing unit;

FIG. 2 is a schematic diagram of the distribution of the tension around the nodal plane of the sealing unit; and FIG. 3 is a cross-sectional view of the drive unit according to the present invention.

DESCRIPTION OF PREFERRED EMBODIMENT

The arrangement according to the present invention has been specifically developed and produced for an ultrasound sealing unit 1 of the type which is shown in FIG. 1, or similar sealing units 1. The sealing unit 1 substantially consists of a drive unit 2 and a homogeneous body 13.

The drive unit 2 of the sealing unit 1 consists of a number of piezoelectric ceramic plates 3 with interjacent, conductive metal sheets 4. The metal sheets 4 are coupled to an a.c. source (not shown), so that the piezoelectric ceramic plates 3 are electrically connected in parallel. The ceramic plates 3 and metal sheets 4, together with a counterweight 5, are held together under pretensioning by a clamping screw 6. The clamping screw 6 is also employed to secure the drive unit 2 in the body 13 of the sealing unit 1. The drive unit 2 converts the electric potential into a mechanical displacement which gives rise to the oscillation that constitutes the sealing work of the unit 1.

The body 13 of the sealing unit 1 consists of reaction bodies 7 which surround the drive unit 2, and a horn 8 with an elongate, narrow sealing surface 9. The purpose of the reaction bodies 7 is to absorb the oscillations that occur on oscillation of the horn 8. Between the horn 8 and the reaction bodies 7, there is formed a nodal plane 10 where the amplitude of the unit 1 is zero. The nodal plane 10 is provided with an anchorage edge 11 in which the sealing unit may be fixed. The reaction bodies 7 of the sealing unit 1, the nodal plane 10 with its anchorage edge 11, and the horn 8 are preferably manufactured from titanium, but may also be manufactured from aluminium. The body 13 of the sealing unit 1 is in the preferred embodiment of one piece manufacture as a homogeneous body, but the parts may of course be manufactured separately and subsequently assembled to form a body 13.

The above described sealing unit 1 has been particularly designed and produced for use in filling machines of the type which fills liquid foods into packaging containers of the single use disposable type. In these filling machines, there is but limited space available for an ultrasound sealing unit, in particular when the intention is to employ such equipment as a retrofit in already existing machines without these needing to be reconstructed or redesigned to any appreciable degree. The sealing unit, according to FIG. 1, therefore has a total length of one half of a wavelength. In the filling machine which operates with a continuous material web of a laminate with paper or paperboard and thermoplastic, as well as possibly aluminium, this material web is formed into a tube with a longitudinal joint or seam seal. The tube is filled with the intended contents and individual packaging containers are produced by means of transverse joint seals in which the material web is severed. The sealing unit 1 according to FIG. 1 is intended to be employed for transverse joint seals, for which reason the horn 8 of the unit 1 is terminated by an elongate, narrow sealing surface 9. The width of the sealing surface 9 corresponds to the width of the transverse joint seal. In order to achieve the requisite length of the transverse joint seal, a number of sealing units 1 must be integrated together to form a complete unit of sealing equipment.

Given that an ultrasound sealing unit 1 of the above described type will have an extremely complicated geometry, there will be a minor residual motion in the nodal plane 10 even though the amplitude in the nodal plane 10 is zero. As shown in the lower part of FIG. 2, this motion consists of a combined longitudinal oscillation and a flexural oscillation. The motion may be described as an undulation movement in one plane. The intention is that only the longitudinal oscillation, the oscillation of the ultrasound sealing unit 1 which is required for the work of the unit 1, be propagated further to the ceramic plates 3 in the drive unit 2. The piezoelectric ceramic plates 3 withstand considerable compression loading, but they are brittle and are extremely sensitive to tensile and flexural stresses. It is therefore desirable that only the longitudinal oscillations, as shown in the upper part of FIG. 2, be propagated to the ceramic plates 3 in the drive unit 2.

This problem is solved in that the arrangement according to the present invention consists of a gasket 12 of the same dimensions as the ceramic plates 3, the gasket being placed between the ceramic plates 3 and the nodal plane 10 of the sealing unit 1. The gasket is held in place by the clamping screw 6 which, at high pressure, holds together the ceramic plates 3, the metal sheets 4 and the counterweight 5. The gasket 12 will constitute a spacer of thickness H between the ceramic plates 3 and the body 13 of the sealing unit 1.

The gasket 12 should be manufactured from a material which does not damp the longitudinal oscillations that are fundamental to the sealing work of the sealing unit 1, i.e. the material must have a high Q value. On the other hand, the gasket 12 must weaken the harmful flexural oscillations so that they cannot destroy the fragile ceramic plates 3. The gasket is, therefore, manufactured from a material which has a lower modulus of elasticity than the materials that surround the gasket 12, i.e. the modulus of elasticity of the ceramics which lies at approximately 75–120 GPa and the modulus of elasticity of the material from which the body 13 of the sealing unit 1 is manufactured. The nodal plane 10 with anchorage edge 11, reaction bodies 7 and horn 8 which together constitute a homogeneous body 13, are normally manufactured from titanium which has a modulus of elasticity of approximately 110 GPa. In the preferred embodiment, the gasket 12 is manufactured from aluminium which has a modulus of elasticity of 70 GPa. In the case when the homogeneous body 13 in the unit 1 is manufactured from aluminium, the gasket 12 should be selected from a material possessing a lower modulus of elasticity than aluminium, such as, for example, chromium or bismuth. An alternative is to employ a gasket of the same or higher modulus of elasticity than any of the surrounding materials, i.e. the ceramics or the material of the body 13. However, experiments have shown that the results of the work of the sealing unit 1 will be improved when use is made of a material in the gasket 12 possessing a lower modulus of elasticity.

Since the surface of the nodal plane 10 in which the drive unit 2 is to be secured is difficult to manufacture in titanium so as to be completely smooth and even, the soft aluminium gasket 12 will even out any possible unevenness. The soft aluminium surface is moreover easy to form and shape so that the abutment of the gasket 12 against the ceramic plates 3 will be as flat as possible.

When a number (preferably three) of sealing units 1 are built together in a filling machine in order to achieve a sufficiently long transverse seal, there are extremely strict demands that the units must work at the same amplitude. Several filling machines may, in addition, be in operation in the same premises, for which reason exchangeability of the sealing units 1 must be total. The piezoelectric ceramic plates 3 are, however, difficult to manufacture with exactly the same characteristics in all respects, for which reason discrepancies may give rise to variations in the amplitude of the different units 1. By varying the thickness dimensions of the gasket 12 lying between the ceramic plates 3 and the nodal plane 10, it is possible to govern the amplitude of the drive unit 2 to a predetermined and preselected amplitude. The amplitude is modified such that a thinner gasket 12 gives a lower amplitude and a thicker gasket 12 gives a higher amplitude. The amplitude is modified because of the fact that the electro-mechanical coupling factor is changed.

One alternative to modifying the thickness of the gasket 12 is to change the material in the gasket 12 to a material with a different modulus of elasticity. A further alternative is to vary the size of the contact surface or interface between the gasket 12 and the body 13 on the sealing unit 1. The surface of the gasket 12 against the ceramic plates 3 should, however, be equal to the surface of the ceramic plates 3. The preferred alternative which is most economical and most easily manufactured is, however, the first-mentioned in which the height H of the gasket 12 is varied so as to obtain the desired amplitude.

By calibrating the ceramic plates 3, it is possible to select a specific gasket 12 and thereby, already in the manufacturing stage of the ultrasound sealing unit 1, obtain units 1 which all operate at the same amplitude.

As will have been apparent from the foregoing description, the arrangement according to the present invention realises a drive unit 2 in which residual flexural oscillations in the nodal plane 10 of the unit 1 are not propagated to the sensitive ceramic plates 3 in the drive unit 2.

Employing the arrangement according to the present invention, it is moreover possible to realise a control of all manufactured sealing units so that they all operate at the same amplitude. This amplitude is otherwise governed by discrepancies in the characteristics of the ceramic plates 3, for which reason it is possible to reduce the standard requirements on the ceramic plates 3.

The present invention should not be considered as restricted to that described above and shown on the Drawings, many modifications being conceivable without departing from the spirit and scope of the appended claims.

What is claimed is:

1. An ultrasound sealing unit comprising:
   a drive unit that includes a plurality of piezoelectric ceramic plates with interjacent conductive metal sheets for being coupled to a power source;
   a horn on which the drive unit is mounted;
   a clamping screw extending through the ceramic plates and into the horn to fix the drive unit on the horn; and
   a gasket provided between the drive unit and the horn for preventing residual flexural oscillations from being transmitted to the drive unit yet permitting oscillation of the sealing unit during operation of the sealing unit, the gasket being fixed in place between the horn and the drive unit by the clamping screw.

2. An ultrasound sealing device according to claim 1, wherein the gasket is made of a material having a lower modulus of elasticity than the material from which the horn is manufactured.

3. An ultrasound sealing unit according to claim 2, wherein said gasket is made of a material having a lower modulus of elasticity than the modulus of elasticity of the ceramic plates.

4. An ultrasound sealing unit according to claim 1, wherein the horn is manufactured from titanium and the gasket is manufactured from aluminum.

5. An ultrasound sealing unit according to claim 1, wherein the horn is manufactured from aluminum and the gasket is manufactured from chromium.

6. An ultrasound sealing unit according to claim 1, wherein the horn is manufactured from aluminum and the gasket is manufactured from bismuth.

7. An ultrasound sealing unit according to claim 1, including a plurality of reaction bodies positioned on opposite sides of the drive unit.

8. An ultrasound sealing unit, comprising:
   a drive unit that includes a plurality of piezoelectric ceramic plates with interjacent conductive metal sheets for being connected to an a.c. source, and a counterweight positioned on the ceramic plates and the interjacent conductive metal sheets;
   a horn on which the drive unit is mounted;
   a clamping screw extending through the ceramic plates and into the horn to fix the drive unit on the horn; and
   a gasket provided between the horn and the drive unit, said gasket being made of a material having a lower modulus of elasticity than the ceramic plates and the horn to prevent residual flexural oscillations from being transmitted to the drive unit yet permitting oscillation of the sealing unit during operation of the sealing unit, the gasket being fixed in place between the horn and the drive unit by the clamping screw.

9. An ultrasound sealing unit according to claim 8, wherein the horn is manufactured from titanium and the gasket is manufactured from aluminum.

10. An ultrasound sealing unit according to claim 8, wherein the horn is manufactured from aluminum and the gasket is manufactured from chromium.

11. An ultrasound sealing unit according to claim 8, wherein the horn is manufactured from aluminum and the gasket is manufactured from bismuth.

12. An ultrasound sealing unit according to claim 8, including a plurality of reaction bodies positioned on opposite sides of the drive unit.

13. An ultrasound sealing unit, comprising:
   a drive unit that includes a plurality of piezoelectric ceramic plates with interjacent conductive metal sheets for being connected to an a.c. source and a counterweight positioned on the ceramic plates and the interjacent conductive metal sheets;
   a body on which the drive unit is mounted, the body including a horn having a long and narrow sealing surface remote from said drive unit and a plurality of reaction bodies, with a nodal plane being defined between the horn and the reaction bodies;
   a gasket positioned between the drive unit and the horn, the gasket being made of a material having a lower modulus of elasticity than the body and the ceramic plates to prevent residual flexural oscillations from being transmitted from the nodal plane to the drive unit yet permitting oscillation of the sealing unit during operation of the sealing unit; and
   a clamping screw extending through the ceramic plates and into the horn to fix the drive unit on the body and hold the gasket in place between the horn and the drive unit.

14. An ultrasound sealing unit according to claim 13, wherein the reaction bodies are positioned on opposite sides of the drive unit.

* * * * *